United States Patent [19]
Holman

[11] Patent Number: 4,781,412
[45] Date of Patent: Nov. 1, 1988

[54] ROTATING CHILD'S SEAT

[76] Inventor: Tommy E. Holman, 8974 Marlow St., Shreveport, La. 71118

[21] Appl. No.: 46,784

[22] Filed: May 7, 1987

[51] Int. Cl.$^4$ .............................................. B60N 1/12
[52] U.S. Cl. .................................. 297/238; 296/65.1; 297/14; 297/257; 297/328; 297/355
[58] Field of Search ................. 297/14, 191, 238, 216, 297/257, 328, 355, 377, 379; 296/63, 64, 65 R, 37.16

[56] References Cited

U.S. PATENT DOCUMENTS

| | | |
|---|---|---|
| 4,533,176 | 8/1985 | Wyttenbach ...................... 297/14 X |
| 4,664,443 | 5/1987 | Casale ................................. 297/238 |
| 4,690,449 | 9/1987 | Holman ............................ 296/65 R |

FOREIGN PATENT DOCUMENTS

| | | | |
|---|---|---|---|
| 3215488 | 11/1983 | Fed. Rep. of Germany ...... 297/238 |
| 3243030 | 5/1984 | Fed. Rep. of Germany ...... 297/278 |
| 3513220 | 10/1986 | Fed. Rep. of Germany ...... 297/483 |
| 2226299 | 11/1974 | France ................................. 297/216 |

Primary Examiner—Kenneth J. Dorner
Assistant Examiner—Peter R. Brown
Attorney, Agent, or Firm—John M. Harrison

[57] ABSTRACT

A rotating child's seat for mounting in the seat backrest of a vehicle, which includes a rotating frame having a seat portion attached to one side thereof and a padded back portion secured to the opposite side. The rotating frame is rotatably and adjustably mounted on fixed supports located in a bifurcation provided in the center section of the seat backrest. When located in functional configuration, the seat portion of the rotating child's seat faces forwardly of the backrest at a selected angle determined by a latch mechanism and extends over the rear bench seat in the vehicle to position a child securely in the back seat of the vehicle. When the rotating child's seat is not in use, the latch mechanism is released and the rotating frame can be rotated or pivoted on pivot pins linking the rotating frame to the fixed supports, in order to position the back portion in alignment with the bifurcated backrest to accommodate one or more additional adults in the rear seat of the vehicle.

20 Claims, 1 Drawing Sheet

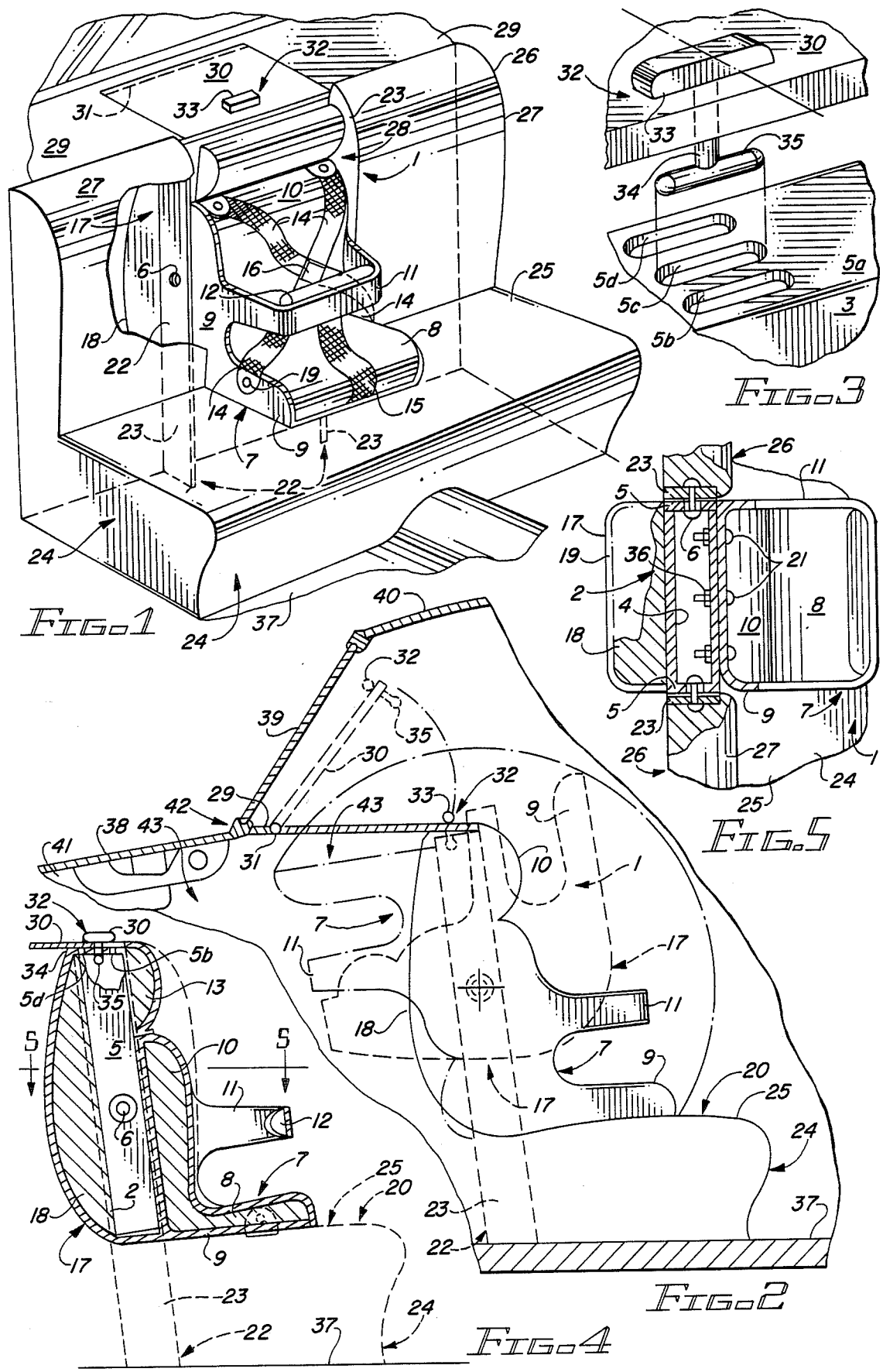

ROTATING CHILD'S SEAT

BACKGROUND OF THE INVENTION

1. Field of the Invention

This invention relates to vehicle seats for infants and children and more particularly, to a rotating child's seat which is adjustably mounted in the front or rear seat backrest of a vehicle. In a preferred embodiment, the rotating child's seat is rotatably or pivotally mounted in a bifurcation provided in the rear seat backrest above the rear bench seat of the vehicle. When the rotating child's seat is in use, an infant or child is strapped in the seat portion thereof while the seat portion is oriented forwardly of the backrest and above the bench seat at a selected angle. The seat portion of the rotating child's seat is fitted with conventional shoulder straps and a leg divider strap and in a preferred embodiment, is designed to rotate or pivot to a stored and nonfunctional position in the vehicle trunk when not in use. When the rotating child's seat is so positioned in the trunk of the vehicle, a back portion rotates or pivots into alignment with the backrest pads of the backrest to accommodate an additional adult or adults on the back seat of the vehicle. An adjusting panel latch and hinged access panel in the trunk divider serve to facilitate rotation or pivoting of the rotating child's seat into adjustable functional and stored configurations, respectively.

One of the problems associated with the use of portable seats and similar structures known as "car seats" for carrying infants and children in vehicles, is that of properly supporting and stabilizing the car seats on the front or rear seats of a vehicle. Typically, straps, bars, belts and harness restraints of various description are used to engage the vehicle seats, in order to immobilize or at least partially stabilize the car seats such that children can be placed in, transported and removed from the seats at the convenience of the parents with at least some degree of security. A disadvantage found in car seats and carriers of this design is the requirement of periodically tightening the straps, belts or harness to secure the car seats in place and subsequently loosening the restraints to remove the seats when it is desired to provide room for one or more additional adults. Furthermore, under circumstances of severe braking or acceleration of the vehicle, the securing restraints of the infant seat or carrier sometimes work loose and allow the carrier to fall forward or sideways while the vehicle is in motion, which may result in injury to the infant or child. This problem is intensified under circumstances where the straps or restraints are periodically loosened to remove the carrier from the vehicle. Legislation requiring that children and infants be secured in a properly designed car seat has been enacted.

2. Description of the Prior Art

Various types of removable or foldable vehicle seats are known in the prior art. Among these is the "Car Seat" disclosed in U.S. Pat. No. 1,337,295, dated Apr. 20, 1920, to C. H. Turner. The Turner car seat is designed to accommodate the motorman or car operator in vehicles such as street cars and the like and is characterized by a pivoting auxiliary seat which is mounted to a conventional vehicle seat and is designed to pivot into functional configuration for driver seating purposes and alternatively, into a folded configuration to accommodate a passenger. Another early "Vehicle Seat" is disclosed in U.S. Pat. No. 461,832, dated Oct. 27, 1891, to G. E. Hatch. The Hatch vehicle seat is a supplemental seat which is arranged and supported over the main seat in a vehicle in such a manner as to leave practically the full seating space of the main seat for use by the persons occupying it. The supplemental seat is supported by a narrow frame, part of which rests on the primary seat and another element of which engages the underside of the primary seat for support purposes. The vehicle seat is designed to fold flat for storage in another location. U.S. Pat. No. 3,951,450, dated Apr. 20, 1976, to Paul Gambotti, discloses an "Infant Seat For Automotive and Other Vehicles". This seat is designed for an automobile or other vehicle and is mounted in an open recess in the back of a primary vehicle seat. The infant seat is folded and articulated in this recess, such that it may be received fully in the recess or alternatively extended from the recess to accommodate a child. U.S. Pat. No. 2,140,968, dated Dec. 20, 1938, to A. Paranzino discloses an "Automobile Body", which incorporates a folding seat arrangement to facilitate a sleeping compartment in the rear area of an autombile. The seat cushion folds and extends to accommodate an auxiliary seat cushion which is normally located in the trunk to facilitate the sleeping accommodations. A "Built-In Automobile Refreshment Bar" is disclosed in U.S. Pat. No. 2,525,952, dated Oct. 17, 1950, to C. J. Saterlie, et al. The refreshment bar is located behind the rear bench seat in the vehicle and is opened by swinging the seat back portion forwardly, with the seat back portion then serving as a table upon which articles of food and drink may be retrieved from the compartment and served. U.S. Pat. No. 2,966,201, dated Dec. 27, 1960, to L. W. Strahler, discloses an "Automobile Seat and Cradle". The automobile seat and cradle detailed in this patent includes an arm rest provided with a cavity therein for receiving an infant when in the downwardly-folded configuration. U.S. Pat. No. 4,555,135, dated Nov. 26, 1985, to V. L. Freeland, discloses a "Built-In Child's Safety Seat for Vehicles". The safety seat may be conveniently stored within the horizontal seating surface of a passenger seat when not in use. A child's safety seat is deployed by a simple pulling motion, wherein the safety seat is deployed from the bench seat such that the child is positioned in a rearwardly-facing orientation facing the backrest portion of the seat. A "Seat For Vehicles" is disclosed in U.S. Pat. No. 4,558,905, dated Dec. 17, 1985, to T. Natori. The seat detailed in this patent includes a top layer member which incorporates a heating element therein. Each of the heating elements is enclosed by a cover which is extended with an integral hang portion for fixing the top layer member. The hang portion is fixedly secured to a fixing member provided within the seat. An "Integrated Safety Seat For Children in Motor Cars" is disclosed in German Patent No. 3,215,488, dated November, 1983. The child's safety seat is integrated into the vehicle seat back so that the seat back shell can be tipped forward on a horizontal axis. The angle of the seat can then be adjusted by lifting the hinge axle within the main seat back. A "Rear Parcel Shelf For An Automobile" is disclosed in Japanese Patent No. 0057537, which issued in May of 1981. The patent details a rotatory means and a cooperating slide means mounted to a front parcel shelf for an automobile, in order to facilitate receipt and removal of parcels in a compartment closed by the rotatory means and cooperating sliding means. U.S. Pat. No. 3,822,911, dated July 9, 1974, to A. O. Radke, et al, discloses a "Convertible Seat, Support Platform and Storage Compartment For Motor Vehicle". The convertible seat detailed in this patent includes a base portion for supporting a seat cushion and rearwardly-extending, upright side portions. The side portions are connected at their upper edges by top and front wall portions which cooperate with a rear seat cushion attached to the front of the uprights below the front wall portion, to define the storage compartment behind the seat. The front seat cushion is pivotally mounted to the base so that it may be flipped forwardly to define a flat support platform. A two-sectioned rear flat support platform is also pivotally mounted behind the rear seat cushion in such a way that the reat support sections can be held in a generally vertical position when not being used, thus permitting the storage compartment to accommodate tall articles. Alternatively, the rear sections can be placed in a horizontal position within the rear section, either being folded under the front section or extended outwardly therefrom, to provide a shallow or deep lower shelf in the storage compartment.

It is an object of this invention to provide a rotating child's seat for installation in vehicles, wherein the rotating child's seat is designed to selectively rotate or pivot into a functional, adjustable configuration above the bench seat of the vehicle and into a nonfunctional configuration, either into the trunk, when the child's seat is mounted in the rear seat backrest, or rearwardly of the front seat backrest, when the child's seat is mounted in the front seat backrest.

Another object of this invention is to provide a new and improved child's seat for vehicles, which child's seat is rotatably or pivotally mounted in the backrest of either the front or back seat of the vehicle, such that the child's seat can be selectively rotated or pivoted into functional configuration above the bench seat in one of several adjustable positions, and a child placed therein and securely strapped thereto and the child's seat alternatively rotated or pivoted rearwardly of the backrest into the trunk of the vehicle or rearwardly of the front seat, when not in use.

Still another object of this invention is to provide a rotating child's seat which is rotatably mounted in a bifurcation provided in the backrest of the rear seat of a vehicle, wherein a child can be strapped into the child's seat when the child's seat is located in functional configuration over the bench seat at a selected angle with respect to the vertical and when the child's seat is not in use, it can be rotated into the trunk and a cooperating contoured back portion of the child's seat rotated into the bifurcation in alignment with the vehicle seat backrest.

Yet another object of the invention is to provide a rotating child's seat which is pivotally mounted in a slot or bifurcation provided in the rear backrest of a vehicle seat, which rotating child's seat is provided with a seat portion having an angle adjustment feature for accommodating an infant or child in a selected angular relationship with respect to the backrest and a back portion which corresponds substantially to the curvature of the vehicle seat backrest, wherein the rotating child's seat can be pivoted into functional configuration to adjustably carry a child on the seat portion thereof, or into a stored configuration in the trunk, with the contoured back portion provided in alignment with the backrest pad of the seat backrest.

A still further object of this invention is to provide a rotating child's seat for vehicles, which child's seat is rotatably and pivotally mounted in an opening in the reat backrest of a vehicle seat, with a hinged access panel provided in the trunk divider, a panel latch attached to the trunk divider and spaced seat-adjusting openings located in the pivoting element of the child's seat for receiving the panel latch, to both stabilize the child's seat at a selected angle and facilitate rotation and pivoting of the child's seat, such that the seat portion is oriented into functional configuration above the bench seat and selectively into non-functional configuration in the trunk of the vehicle.

SUMMARY OF THE INVENTION

These and other objects of the invention are provided in a new and improved child's seat which is designed for rotational movement in a slot or bifurcation provided in the backrest of a vehicle and is characterized by a seat portion for accommodating an infant or child in selected angular relationship and a back portion, which seat portion and back portion can be selectively and adjustably rotated or pivoted in the bifurcation into functional configuration above the bench seat, as desired. In a most preferred embodiment, an access panel having a pivoting panel latch is provided in the trunk divider and spaced slots are provided in the pivoting seat, for adjustably receiving the panel latch to both stabilize the child's seat in a selected angular orientation and facilitate rotation or pivoting of the child's seat in the bifurcation.

BRIEF DESCRIPTION OF THE DRAWINGS

The invention will be better understood by reference to the accompanying drawing, wherein:

FIG. 1 is a perspective view, partially in section, of a preferred embodiment of the rotating child's seat of this invention installed in the backrest of a rear seat in a vehicle;

FIG. 2 is a sectional view of the rotating child's seat and the rear seat and body portion of a vehicle, more particularly illustrating a preferred range of rotation of the child's seat illustrated in FIG. 1;

FIG. 3 is a perspective, exploded view of a preferred adjustable latch and access panel configuration for stabilizing and implementing rotation and angular adjustment of the rotating child's seat;

FIG. 4 is a side sectional view of the rotating child's seat illustrated in FIG. 1; and FIG. 5 is a top sectional view, taken along line 5—5, of the rotating child's seat illustrated in FIG. 4.

DESCRIPTION OF THE PREFERRED EMBODIMENTS

Referring initially to FIGS. 1, 3 and 5 of the drawing, the rotating child's seat of this invention is generally illustrated by reference numeral 1. As illustrated in FIGS. 3 and 5, the rotating child's seat 1 is characterized by a rotating frame 2 having a front panel 3, a rear panel 4, side panels 5 and a top panel 5a, fitted with a front panel slot 5b, a middle panel slot 5c and an end panel slot 5d. The perimeter of the rotating frame 2 is closed by a bottom panel (not illustrated) which is also provided with a slot (not illustrated) for securing the rotating child seat 1 in non-functional, stored configuration, as hereinafter described. Pivot pins 6 are provided in oppositely-disposed relationship in the side panels 5 and are secured to parallel pivot panels 23, which are mounted in a backrest slot 28 provided in the backrest 26 of a rear vehicle seat 20. The pivot panels 23 are optionally secured to the floor 37 of the vehicle 42 and in a preferred embodiment, the pivot panels 23 extend throughout the width of the backrest 26 and downwardly through the bench seat 24, for anchoring to the floor 37 of the vehicle 42. Accordingly, the rotating frame 2 can be rotated or pivoted through an angle of up to 180 degrees with respect to the pivot panels 23 on the pivot pins 6, to selectively position the rotating child's seat 1 into both a functional and non-functional configuration, as hereinafter described.

In another preferred embodiment of the invention the rotating child's seat 1 is further characterized by a seat portion 7, provided with a seat pad 8 for supporting an infant or child, which seat pad 8 is located in a rigid seat frame 9. A back pad 10 is fitted into the upper portion of the seat frame 9 and a U-shaped arm rest 11 extends from the seat frame 9 in parallel relationship with respect to the seat pad 8, in order to accommodate an arm pad 12, as illustrated. A head pad 13 is also provided in the rotating frame 2 above the top edge of the seat frame 9. Shoulder straps 14 extend diagonally across the back pad 10 and are secured at both ends to four belt brackets 19, attached to the seat frame 9 in conventional fashion. A buckle 16 serves to secure the free ends of the shoulder straps 14 together at a point opposite the arm pad 12, in order to accommodate a child or infant securely against the back pad 10 and seated on the seat pad 8. A divider strap 15 is anchored to the seat frame 9 and the arm rest 11 and serves to separate the legs of the infant or child and prevent the infant or child from sliding beneath the shoulder straps 14 and from the rotating child's seat 1 in the event of sudden braking or swerving of the vehicle 42. The rotating child's seat 1 is further provided with a contoured back portion 17, which is mounted on the opposite side of the rotating frame 2 from the seat portion 7 and is designed to align with the backrest pad 27 of the backrest 26, when the seat portion 7 of the rotating child's seat 1 is rotated or pivoted rearwardly into the trunk 43 of the vehicle 42, as illustrated in FIG. 2. Accordingly, in a most preferred embodiment of the invention, the back portion 17 of the back portion 17 is provided with a contour which approximates the contour of the back rest pad 27 of the back rest 26, to accommodate one or more additional adults when the rotating child's seat 1 is positioned in the trunk 43 of the vehicle 42 in non-functional orientation.

As further illustrated in FIG. 5 in another most preferred embodiment of the invention, mount bolts 21 are used, along with cooperating nuts 36, to secure the seat frame 9 of the seat portion 7 to the front panel 3 of the rotating frame 2. Accordingly, it will be appreciated that various designs for the seat portion 7 can be envisioned for use in cooperation with a common rotating frame 2, according to the teachings of this invention, depending upon the size of the child which will occupy the respective seat portion 7.

Referring now to FIGS. 1-4 of the drawing in yet another most preferred embodiment of the invention, the rotating child's seat 1 is typically mounted in the backrest 26 of the rear vehicle seat 20 of a vehicle 42, such as an automobile. The seat portion 7 of the rotating child's seat 1 is located over the bench seat pad 25 of a conventional bench seat 24. Under these circumstances, an access panel 30 is attached to the trunk divider 29 of the vehicle 42 by means of a panel hinge 31 and is secured to the top panel 5a of the rotating frame 2, by means of a panel latch 32. The panel latch 32 is further characterized by a latch grip 33 and a cooperating latch pin 34, which extends rotatably downwardly from the latch grip 33 through the access panel 30. A latch retainer 35 is fitted to the extending end of the latch pin 34 and is designed to register with a selected one of the top panel slot 5b, middle panel slot 5c and end panel slot 5d, provided in spaced relationship in the top panel 5a of the rotating frame 2. Accordingly, the access panel 30 can be secured to the rotating frame 2 to stabilize the rotating frame 2 and orient the seat portion 7 at a selected angle with respect to the backrest 26, by extending the latch retainer 35 and latch pin 34 selectively through the top panel slot 5b, middle panel slot 5c or end panel slot 5d and rotating the latch grip 33. Conversely, when it is desired to rotate or pivot the seat portion 7 of the rotating child's seat 1 into the trunk 43 of the vehicle 42, the latch grip 33 can be manipulated to align the latch retainer 35 with the engaged top panel slot 5b, middle panel slot 5c or end panel slot 5d and the access panel 30 lifted on the panel hinge 31, to facilitate the desired adjustment, as hereinafter further described. As further illustrated in FIG. 2, for purposes of illustration, the rotating child's seat 1 is mounted in the vehicle 42 forwardly of and beneath the rear window 39 and below the rear section of the roof 40. A portion of the trunk lid 38 is also illustrated, along with the trunk hinge 41, in order to better visualize a preferred path of rotation of the rotating child's seat 1 in the vehicle 42 according to the teachings of this invention.

In operation and referring again to the drawing, the rotating child's seat 1 is manipulated with respect to the rear vehicle seat 20 in the vehicle 42, as follows. If the rotating child's seat 1 is positioned as illustrated in FIGS. 1, 2, 4 and 5 of the drawing, with the seat portion 7 facing forwardly in functional child-supporting configuration and it is desired to rotate the seat portion 7 into the trunk 43, the latch grip 33 in the panel latch 32 is initially rotated to align the latch retainer 35 with the engaged top panel slot 5b, middle panel slot 5c or end panel slot 5d, located in the top panel 5a of the rotating frame 2. The access panel 30 is then lifted on the panel hinge 31 to the position illustrated in phantom in FIG. 2, to provide an access through the trunk divider 29 for rotating the rotating child's seat 1 on the pivot pins 6. The rotating child's seat 1 is then rotated or pivoted approximately 180 degrees in a counter-clockwise direction, as illustrated in FIG. 2, to a position such that the back portion 17 is located in alignment with the backrest pad 27 of the backrest 26. The latch retainer 35 is then inserted in a second slot (not illustrated) provided in the bottom panel (not illustrated) of the rotating frame 2, to secure the seat portion 7 of the rotating child's seat 1 in the trunk 43 of the vehicle 42 and the back portion 17 in the backrest slot 28. Reorientation of the seat portion 7 of the rotating child's seat 1 into the configuration illustrated in FIG. 1 is achieved by reversing the procedure outlined above.

Referring again to FIG. 2 of the drawing, while the rotating child's seat 1 can be designed to facilitate a full 360 degrees rotation in the backrest slot 28, a more limited range of pivot to the extent of about 180 degrees is only necessary, in order to locate either the seat portion 7 or the back portion 17 in the trunk 43 of the vehicle 42, as heretofore described. Hence, the rotating child's seat 1 can be either fully or partially rotatably or pivotally adjusted in the backrest slot 28, depending upon the desired design of the rotating frame 2, seat portion 7 and back portion 17.

It will be appreciated by those skilled in the art that although it is illustrated in cooperation with a rear vehicle seat 20, the rotating child's seat 1 of this invention is also capable of being mounted in the backrest 26 of a front vehicle seat (not illustrated) of a vehicle. However, in a most preferred embodiment, the rotating child's seat 1 is mounted in the backrest 26 of the rear vehicle seat 20, in order to facilitate rotation of the seat portion 7 into the trunk 43 of the vehicle 42 and the back portion 17 into alignment with the backrest pad 27, when it is desired to accommodate an additional adult or adults on the rear vehicle seat 20. However, under circumstances where the rotating child's seat 1 is positioned in the backrest 26 of a front vehicle seat, it will be appreciated that the seat portion is rotated or pivoted rearwardly of the front vehicle seat and immediately forwardly of the rear vehicle seat 20, instead of into the trunk 43, when the rotating child's seat 1 is rotated or pivoted into the non-child supporting configuration.

It will be further appreciated that the rotating child's seat 1 of this invention provides a simple, positive and expedient means of supporting an infant or child of any age in a secure manner at a selected seating angle in a vehicle, while at the same time providing the option of seating another adult or adults on the rear vehicle seat 20 in a quick and efficient manner. Furthermore, the rotating child's seat 1 is simple in design, easy to adjust to position a child in a selected supporting angle and can be easily installed in existing vehicles by modifying only the backrest 26 of the rear vehicle seat 20, since the pivot panels 23 can be designed for compatibility with the shape and design of any rear vehicle seat 20, according to the knowledge of those skilled in the art. Additionally, the seat frame 9 of the seat portion 7 can be shaped from conventional moldable materials such as plastic materials into a desired configuration according to the knowledge of those skilled in the art and the back portion 17 can be upholstered and contoured to match the backrest pad 27 of the backrest 26 by conventional techniques.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A rotating child's seat for vehicles having a storage area and at least one bench seat with a cooperating backrest, said rotating child's seat comprising seat means adapted to support a child; an opening provided in the backrest for receiving said seat means in pivoting relationship; pivot means carried by the backrest, said pivot means engaging said seat means near the center of said seat means in transverse relationship; and seat angle adjusting means carried by the vehicle and adapted to engage the top of said seat means in adjustable relationship, whereby said seat means is selectively rotated on said pivot means through an arc of substantially 180 degrees into a first functional orientation over the bench seat in the vehicle at a selected angle with respect to the bench seat and into a second stored configuration in the storage area.

2. The rotating child's seat of claim 1 further comprising a pair of substantially vertically oriented supports provided in spaced, substantially parallel relationship in said opening and wherein said pivot means is carried by said supports and said seat means is rotatably disposed between said supports.

3. The rotating child's seat of claim 1 wherein said seat means is further characterized by a rotating frame and a seat portion carried by one side of said rotating frame, said seat portion contoured to receive a child.

4. The rotating child's seat of claim 1 further comprising a pair of substantially vertically oriented supports provided in spaced, substantially parallel relationship in said opening and wherein said seat means is further characterized by a rotating frame disposed between said supports, and said pivot means is rotatably attached to said supports and to a seat portion carried by one side of said rotating frame, said seat portion being contoured to receive a child.

5. The rotating child's seat of claim 4 further comprising fastening means extending through said seat portion and said rotating frame for securing said seat portion to said rotating frame.

6. The rotating child's seat of claim 3 further comprising a back portion carried by the opposite side of said rotating frame, said back portion contoured to substantially conform to the shape of the backrest.

7. The rotating child's seat of claim 6 further comprising a pair of substantially vertically oriented supports provided in spaced, substantially parallel relationship in said opening and wherein said pivot means is rotatably attached to said supports and to said seat portion, said seat portion being contoured to receive a child, and said rotating frame is rotatably disposed between said supports.

8. The rotating child's seat of claim 7 further comprising fastening means extending through said seat portion and said rotating frame for securing said seat portion to said rotating frame.

9. A rotating child's seat for vehicles having a bench seat and a divided backrest provided in upward-standing relationship with respect to the bench seat, said rotating child's seat comprising seat means adapted to support a child; pivot means provided substantially in the center of said seat means in transverse relationship, said pivot means carried by the divided backrest, whereby said seat means is pivotally supported in the divided backrest; access panel means having one end hingedly carried by the vehicle and the opposite end of said access panel engaging said seat means and latch means carried by said access panel for selectively engaging said seat means and securing said opposite end of said access panel to said seat means; and receiving means provided in said seat means for receiving said latch means; whereby said seat means is selectively pivoted into functional orientation at a selected angle with respect to the bench seat, responsive to engagement of said latch means with said receiving means.

10. The rotating child's seat of claim 9 further comprising a pair of substantially vertically oriented supports provided in spaced, substantially parallel relationship in the divided backrest and wherein said seat means is pivotally disposed between said supports.

11. The rotating child's seat of claim 9 wherein said seat means is further characterized by a rotating frame carrying said pivot means, said rotating frame pivotally mounted in the divided backrest and a seat portion carried by one side of said rotating frame, said seat portion being contoured to receive a child.

12. The rotating child's seat of claim 11 further comprising a back portion carried by the opposite side of said rotating frame, said back portion contoured to substantially conform to the shape of the backrest.

13. The rotating child's seat of claim 9 further comprising a pair of substantially vertically oriented supports provided in spaced, substantially parallel relationship in the divided backrest and wherein said seat means is further characterized by a rotating frame carrying said pivot means, said rotating frame disposed between said supports and pivotally attached to said supports and a seat portion carried by one side of said rotating frame, said seat portion being contoured to receive a child.

14. The rotating child's seat of claim 12 further comprising fastening means extending through said seat portion and said rotating frame for securing said seat portion to said rotating frame.

15. The rotating child's seat of claim 12 wherein said latch means further comprises a latch pin rotatably carried by said access panel means and a latch retainer secured to said latch pin and said receiving means further comprises at least two apertures provided in said seat means for receiving said latch retainer in adjustable relationship.

16. The rotating child's seat of claim 15 further comprising:
(a) fastening means extending through said seat portion and said rotating frame for securing said seat portion to said rotating frame; and
(b) a back portion carried by the opposite side of said rotating frame, said back portion contoured to substantially conform to the shape of the backrest.

17. The rotating child's seat of claim 9 wherein said latch means further comprises a latch pin rotatably carried by said access panel means and a latch retainer secured to said latch pin and said receiving means further comprises at least two apertures provided in said seat means for receiving said latch retainer in adjustable relationship.

18. A rotating child's seat for mounting in the backrest of a rear bench seat in a vehicle, the backrest separating the interior of the vehicle from the trunk of the vehicle, said rotating child's seat comprising an opening in the backrest; a pair of substantially vertically-oriented supports provided in spaced relationship in said opening; a pair of pivot pins pivotally carried by said supports in spaced, transverse relationship, respectively; seat means fixedly attached to said pivot pins, said seat means rotatably disposed between said supports; an access panel having one end hingedly carried by said vehicle and the opposite end of said access panel engaging said seat means; latch means carried by said opposite end of said access panel; and a plurality of apertures provided in spaced relationship in said seat means for receiving said latch means in adjustable relationship, whereby said seat means is adapted to selectively rotate in said opening through an arc of about 180 degrees responsive to manipulation of said latch means and release of said latch means from said apertures and said opposite end of said access panel from said seat means.

19. The rotating child's seat of claim 17 wherein said seat means is further characterized by a rotating frame pivotally attached to said supports, a seat portion carried by one side of said rotating frame and a back portion carried by the opposite side of said rotating frame, whereby said seat portion and said back portion are selectively rotated into the interior of the vehicle and into the trunk of the vehicle.

20. The rotating child's seat of claim 19 further comprising fastening means extending through said seat portion and said rotating frame for securing said seat portion to said rotating frame.

* * * * *